UNITED STATES PATENT OFFICE

2,882,136

1,3,5-TRI(ARYLAMINO)BENZENE AND DERIVATIVES THEREOF AS STABILIZERS FOR PETROLEUM PRODUCTS

John W. Thompson and Wayne V. McConnell, Kingsport, Tenn., assignors to Eastman Kodak Company, Rochester, N.Y., a corporation of New Jersey No Drawing. Application August 23, 1954
Serial No. 451,676

6 Claims. (Cl. 44—75)

This invention relates to the stabilization of various organic compounds which are subject to deterioration by the employment of unusually efficacious deterioration inhibitors, namely, 1,3,5-tri(arylamino)benzene and certain derivatives thereof. This invention is more particularly directed to the stabilization of petroleum products such as gasoline, jet fuels, turbine oils, transformer oils, paraffin wax, etc.

Various aryl amines have been described in many patents and in other scientific literature as being effective antioxidants for petroleum products, rubber, synthetic resins, and other organic materials. Examples of various compounds of this class most commonly referred to include diphenyl amines, phenylnapthyl amines, N,N'-dialkyl-p-phenylenediamines, and N,N'-diaryl-p-phenylenediamines. It is generally well understood in the prior art that aromatic compounds which contain only meta substituted functional groups are relatively ineffective as deterioration inhibitors or antioxidants.

We have now found that 1,3,5-tri(arylamino)benzene and derivatives thereof are surprisingly effective and highly potent antioxidants which can be employed to inhibit the deterioration of petroleum products and many other organic materials which are subject to deterioration.

The high antioxidant potency exhibited by the above compounds is unusual in that meta-substituted benzene derivatives generally are ineffective in protecting organic compositions from oxidative deterioration. For example, catechol, p-aminophenol, and p-phenylenediamine are highly active antioxidants for gasoline, while resorcinol, m-aminophenol, and m-phenylenediamine show little or no activity.

It is a primary object of this invention to provide a new and useful class of antioxidants for the stabilization of organic materials which are subject to deterioration. A further object of this invention is to provide a process whereby these valuable antioxidants can be employed. Another object of this invention is to provide compositions of matter comprising organic materials subject to deterioration containing small amounts of these antioxidants for the purpose of inhibiting deterioration. Other objects will become apparent hereinafter.

The compounds which we have found to be useful as antioxidants are 1,3,5-tri(arylamino)benzene compounds having the following general formula:

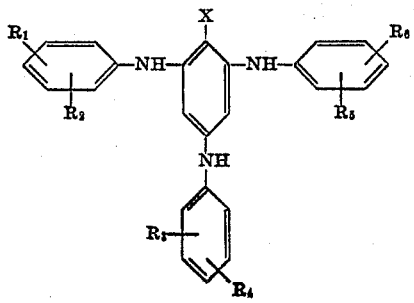

wherein X represents a substituent selected from the group consisting of a hydrogen atom and an alkyl radical containing from 1 to 6 carbon atoms and $R_1$, $R_2$, $R_3$, $R_4$, $R_5$, and $R_6$ each represents a substituent selected from the group consisting of a hydrogen atom, an alkyl radical containing from 1 to 6 carbon atoms, an aryl radical containing from 6 to 9 carbon atoms, an alkoxy radical containing from 1 to 6 carbon atoms, a hydroxy radical, an alkylamino or dialkylamino group wherein the alkyl group contains 1 to 6 carbon atoms, a chlorine atom, a bromine atom and an iodine atom, these six R substituents being positioned in any of the available positions on the respective benzene rings.

Examples of compounds which come within the scope of the general formula which can be advantageously employed as antioxidants in accordance with this invention include, 1,3,5-tri(anilino)-benzene, 1,3,5-tris(4-ethylanilino)-benzene, 1,3,5-tris(4-n-hexylanilino)-benzene, 1,3,5 - tris(2,6 - dimethylanilino) - benzene, 1,3,5 - tri(o - toluino)-benzene, 1,3,5-tri(m-toluino)-benzene, 1,3,5-tri-(p-toluino)-benzene, 2,4,6-tri(p-toluino)-toluene, 2,4,6-tri(anilino)-toluene, 1,3,5-tris(3,5-diphenylanilino)benzene, 2,4,6-tris(o-methoxyanilino)-ethylbenzene, 1,3,5-tris(2,4-dimethylanilino)-benzene, 2,4,6-tris(2,5-dimethylanilino)-n-butylbenzene, 1,3,5-tris(p-chloroanilino)-benzene, 1,3,5-tris(2-chloro-3-methyl-anilino)-benzene, 1,3,5,-tris(p-bromoanilino)-benzene, 1,3,5-tris(p-butoxyanilino)-benzene, 1,3,5-tris(2,5-diethoxyanilino)-benzene, 1,3,5-tris(4 - isoamylanilino) - benzene, 1,3,5 - tris(p-phenylanilino) - benzene, 3,5 - bis(p - methoxyanilino) - diphenylamine, 1,3 - dianilino - 5 - (m - hydroxyanilino) - benzene, etc. Other compounds coming within the scope of this formula can also be similarly employed.

These 1,3,5-tri(arylamino)benzene compounds can be employed as stabilizers for a wide variety of organic compositions that are subject to oxidative deterioration which include those mentioned hereinabove as well as rubber compositions, synthetic and natural resins, plastic compositions, vegetable oils, glyceride oils and fats, vitamin compositions, animal and vegetable waxes, the vitamin content of crops such as alfalfa, etc. Examples of compounds which can be stabilized and which come within the scope of these broad classes include cracked gasoline, kerosene, turbine oils, hydraulic oils, motor oils, cutting oils, carnauba wax, beeswax, paraffin wax, lard, cottonseed oil, linseed oil, the carotene content of alfalfa, synthetic rubber compositions, cellulose acetate, polyesters, alkyd resins, polyethylene, etc.

The subject stabilizers are compatible with and can be employed in conjunction with other types of common additives, such as dyes, metal deactivators, tetraethyllead fluid, and synergists.

The remainder of the disclosure herein is directed more particularly toward the employment of these antioxidants or stabilizers as deterioration inhibitors for hydrocarbon petroleum products which include gasoline, kerosene, hydrocarbon oils, waxes, jet fuels, etc.

It has been found advantageous to employ the antioxidants of this invention in small amounts ranging from about 0.001% to about 0.1% by weight of the organic material subject to deterioration. Smaller amounts such as 0.0001% and larger amounts such as 1% can also be employed depending upon the circumstances. An amount which can be advantageously employed in many instances is about 0.01%–0.05%.

In order to facilitate the incorporation of the antioxidants of this invention into the material to be stabilized against deterioration it is sometimes advantageous to first prepare a solution of the antioxidant in a suitable solvent which is inert to both the antioxidant and the organic material to be stabilized. This solvent can advantageously be a hydrocarbon such as hexane, cyclohexane, benzene, toluene, etc. The concentrated antioxidant in solution can then be added to the material to be stabilized by a simple mixing operation. Concentrates of the antioxidants in a suitable solvent can be prepared so as to contain as much of the antioxidant as can be dissolved in the selected solvent. The degree of concentration is determined primarily as a matter of convenience.

The antioxidants of this invention can be prepared according to the method of Buu-Hoi as described in J. Chem. Soc. (1952), page 4346. The method of Buu-Hoi can be readily adapted to produce any of the compounds covered by the general formula set forth hereinabove. Thus, mixtures of phloroglucinol (or alkyl derivatives thereof) and aniline (or appropriately substituted derivatives of aniline) can be heated in the presence of iodine at temperatures of about 200° C. for periods of time of from about 4 to 6 hours during which time water can be removed from the reaction mixture as it is formed. Quantitative yields of the desired 1,3,5-(triarylamino)benzene compounds have been obtained by this method. The products were purified by recrystallization from such solvents as benzene, benzene-ethanol, and benzene-ether mixtures. These solvents are exemplary of those which can be advantageously employed to form the concentrated antioxidant solutions referred to hereinabove.

In order to further describe the invention the following tables are presented wherein nine examples illustrating this invention are set forth.

The first table shows the effectiveness of 1,3,5-tri-(arylamino)benzenes as antioxidants for gasoline. The test medium employed was a Pennsylvania cracked gasoline containing catalytic and thermal constituents. The induction period of the gasoline (given in minutes) is based on data determined by the oxygen bomb stability test described in Industrial and Engineering Chemistry (Industrial Edition), volume 24, page 1375 (1932). The induction period in accordance with this test is defined as the elapsed time from the start of the test until the onset of rapid oxidation as evidenced by a typical sharp pressure drop in the bomb.

TABLE I

*1,3,5-tri(arylamino) benzenes as antioxidants for gasoline*

| Compound | Conc. in Gasoline, Wt. percent | Induction Period of Gasoline (Minutes) |
|---|---|---|
| None | None | 100 |
| 1,3,5-Trianilino-benzene | 0.01 | 580 |
| 1,3,5-Tri(o-toluino)-benzene | 0.01 | 475 |
| 1,3,5-Tri(m-toluino)-benzene | 0.01 | 590 |
| 1,3,5-Tri(p-toluino)-benzene | 0.01 | 620 |
| 1,3,5-Tris(2,5-dimethylanilino)-benzene | 0.01 | 475 |
| 1,3,5-Tris(o-methoxyanilino)-benzene | 0.01 | 290 |
| 1,3,5-Tris(p-methoxyanilino)-benzene | 0.01 | 715 |

The second table illustrates the effectiveness of the antioxidants of this invention for inhibiting the deterioration of another hydrocarbon petroleum product, viz. turbine oil. The data presented in this table were based on ASTM Method D973-47-T. The turbine oil employed was from a commercial coastal stock having a viscosity of 149 Saybolt Universal seconds at 100° F. The induction period of the turbine oil is the elapsed time from the start of the test until the oil attains an acid number of 0.5.

TABLE II

*1,3,5-tri(arylamino) benzenes as antioxidants for turbine oil*

| Compound | Conc. in Turbine Oil, Wt. Percent | Induction Period of Turbine Oil (Hours) |
|---|---|---|
| None | None | 95 |
| 1,3,5-Trianilino-benzene | 0.05 | 770 |
| 1,3,5-Tris(p-methoxyanilino)-benzene | 0.05 | 683 |

The data presented in the preceding tables clearly illustrate the advantageous character of the 1,3,5-tri-(arylamino)benzene compounds as antioxidants for hydrocarbon petroleum products. Other compounds than those specifically named in these tables and which come within the scope of the general formula defined above can also be similarly employed with advantageous results. Names of typical examples of these compounds have been set forth hereinabove. Other petroleum products which can be similarly stabilized include paraffin wax, kerosene, lubricating oils, and compositions containing such petroleum hydrocarbons. Thus, 1,3-bis(p-toluino)-5-(o-biphenylamino)-benzene can be employed in a manner similar to that illustrated by the tables so as to stabilize paraffin wax. Likewise, 2,4,6-tris(2-chloro-4-methoxyanilino)toluene can be analogously employed to stabilize a motor lubricating oil.

Although all of the compounds illustrated in the tables are effective antioxidants it is apparent that the 1,3,5-tri(para substituted-arylamino)benzene derivatives are outstandingly superior members of the group wherein the R substituents are other than hydrogen.

We claim:

1. Stabilized gasoline normally subject to deterioration containing from 0.001% to 0.1% by weight of a stabilizing compound selected from the group consisting of 1,3,5-tri(anilino)benzene, 1,3,5-tri(o-toluino)benzene, 1,3,5-tri(m-toluino)benzene, 1,3,5-tri(p-toluino)benzene and 1,3,5-tris(p-methoxyanilino)benzene.

2. Stabilized gasoline as defined by claim 1 wherein the stabilizing compound is 1,3,5-tri(anilino)benzene.

3. Stabilized gasoline as defined by claim 1 wherein the stabilizing compound is 1,3,5-tri(o-toluino)benzene.

4. Stabilized gasoline as defined by claim 1 wherein the stabilizing compound is 1,3,5-tri(m-toluino)benzene.

5. Stabilized gasoline as defined by claim 1 wherein the stabilizing compound is 1,3,5-tri(p-toluino)benzene.

6. Stabilized gasoline as defined by claim 1 wherein the stabilizing compound is 1,3,5-tris(p-methoxyanilino)-benzene.

References Cited in the file of this patent

UNITED STATES PATENTS

| 1,971,329 | Calcott et al. | Aug. 28, 1934 |
| 2,027,462 | Ayres et al. | Jan. 14, 1936 |
| 2,032,787 | Bartram | Mar. 3, 1936 |
| 2,067,686 | Semon | Jan. 12, 1937 |

OTHER REFERENCES

Journal of the Chemical Society, London, page 4348, 1952, by Buu-Hoi.